United States Patent [19]
Imafuku et al.

[11] Patent Number: 5,919,880
[45] Date of Patent: Jul. 6, 1999

[54] REACTIVE DYES AND LENSES UTILIZING THE SAME

[75] Inventors: Suguru Imafuku; Soichiro Motono; Hidetoshi Iwamoto, all of Tokyo, Japan

[73] Assignee: Hoya Corporation, Tokyo, Japan

[21] Appl. No.: 08/832,828

[22] Filed: Apr. 3, 1997

[30] Foreign Application Priority Data

Apr. 5, 1996 [JP] Japan .................................. 8-083716

[51] Int. Cl.$^6$ ...................... C08F 226/06; C08F 214/18; C08F 230/08; C08F 220/18

[52] U.S. Cl. ........................... 526/284; 526/242; 526/279; 526/328.5

[58] Field of Search .................... 526/284, 242, 526/279, 328.5

[56] References Cited

FOREIGN PATENT DOCUMENTS

| | | |
|---|---|---|
| 0 396 376 A1 | 11/1990 | European Pat. Off. . |
| 0 621 322 A1 | 10/1994 | European Pat. Off. . |
| 8029741 | 2/1996 | Japan . |
| A-8-29741 | 2/1996 | Japan . |
| 442 578 | 1/1968 | Switzerland . |

OTHER PUBLICATIONS

Raymond S. Asquith, et al., "Self–coloured Polymers based on Anthraquinone Residues", Journal of the Society of dyers and colourists, vol. 93, No. 4, Apr. 1977, pp. 114–125.

*Primary Examiner*—Jeffrey Smith
*Assistant Examiner*—Wu C. Cheng
*Attorney, Agent, or Firm*—Griffin, Butler Whisenhunt & Szipl, LLP

[57] ABSTRACT

A compound represented by the following formula 1:

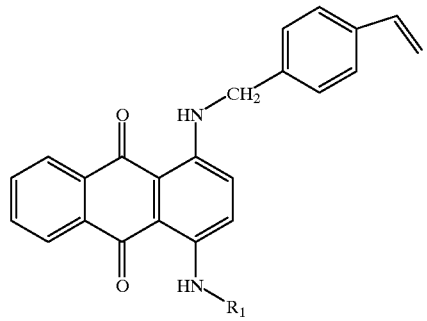

(Formula 1)

wherein $R_1$ is an unsubstituted or substituted benzyl group or unsubstituted or substituted phenyl group, method for producing a copolymer comprising copolymerizing a monomer mixture containing the compound, copolymer for lenses containing a copolymerized component represented by the following formula 2

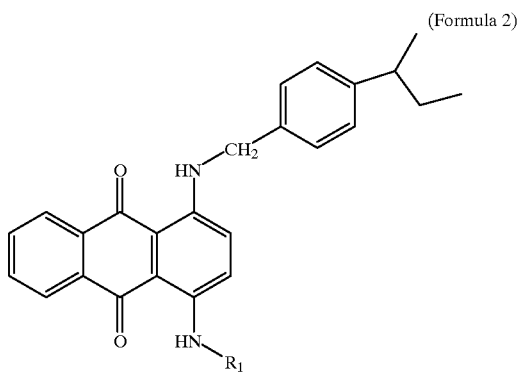

(Formula 2)

and a lens consisting of the copolymer. The compound of the formula 1 is a reactive dye exhibiting excellent hydrolysis resistance, good copolymerizability with other comonomers, excellent dyeing property and proper solubility in comonomers.

8 Claims, 3 Drawing Sheets

REACTIVE DYES AND LENSES UTILIZING THE SAME

BACKGROUND OF THE INVENTION

The present invention relates to a reactive anthraquinone compound useful as a dye, and a lens, in particular, a contact lens, which is colored by the anthraquinone compound.

Most of the currently commercially available lenses are variously colored. Colored lenses have been required for and made with the purposes of improving optical performance and visibility and for their fashionable appearance.

Currently utilized methods for coloring contact lenses are classified into two kinds, i.e., (1) a method of copolymerizing a comonomer solution containing a common and conventional dye, and (2) a method of utilizing a vat dye comprising immersing a transparent lens prepared by the cutting and polishing method or the casting method into a vat dyeing bath so that a lueco dye (reduced compound) can sufficiently impregnate the lens and then immersing the lens into an oxidation bath to convert the leuco dye into a oxidated compound so that the dye is fixed.

In both of the methods mentioned above, dye is retained in the lens material by the absorptivity of the dye to the material or steric hindrance of the network of the lens material. In these cases, however, the dye is simply dispersed in the lens material and enclosed by the absorptivity of the dye to the material or steric hindrance of the network of the lens material. Therefore, with respect to $O_2$ permeable hard contact lenses, which have a low glass transition point and are relatively soft at room temperature, or non-water-retaining soft contact lenses and water-retaining soft contact lenses, dissolution or bleeding of the dye is a serious problem.

To solve such a problem, a reactive dye having a monomer structure similar to that of monomers of lens materials has been proposed. See, for example, EP 0 396 376 A1. This patent document discloses a reactive dye represented by the following formula 3:

(Formula 3)

wherein X represents an unsaturated polymerizable organic residue and P represents a C2–C12 organic divalent residue.

Such a reactive dye as mentioned above can form a copolymer with monomers of the lens material and hence can ameliorate the problem of the dissolution or bleeding out of the dye. However, if the dyes specifically disclosed in EP 0 396 376 A1 were used, they are likely to be hydrolyzed by a nucleophile, in particular water and the like, because their reactive double bonds derived from the starting monomers and the dye units are bonded through an ester bond or amide bond. As a result, secondary dissolution or bleeding of the dye units may occur.

In addition, some of these reactive dyes can hardly be copolymerized because of their poorly copolymerizable structures.

The dissolution of the dye units caused by hydrolysis and the dissolution of unreacted dyes because of their poor copolymerizability are extremely important factors degrading the safety of lenses. These dissolutions greatly depend on the conditions in which the lenses are used. However, the dye units, i.e., the anthraquinone compounds, are quite toxic and therefore the reactive dyes showing excellent hydrolysis resistance and good copolymerizability have been desired so that safer lenses can be provided.

Accordingly, one object of the present invention is to provide a novel reactive dye which shows excellent hydrolysis resistance and good copolymerizability with other material monomers as well as excellent dyeing ability and proper solubility in the material monomers.

A second object of the present invention is to provide a method for producing copolymers utilizing the reactive dye mentioned above and a lens such as a contact lens comprising a copolymer formed by utilizing the reactive dye mentioned above.

SUMMARY OF THE INVENTION

The present invention relates to a compound represented by the following formula 1:

(Formula 1)

wherein $R_1$ is an unsubstituted or substituted benzyl group or unsubstituted or substituted phenyl group, wherein the substituent (s) of the substituted benzyl group are one or more groups selected from the group consisting of a vinyl group, a C1–C6 alkyl group, a C1–C6 alkoxy group, a hydroxyl group and a halogen atom, and, wherein the substituent(s) of the substituted phenyl group are one or more groups selected from the group consisting of a C1–C6 alkyl group, a C1–C6 alkoxy group, a hydroxyl group and a halogen atom.

The present invention further relates to a method for producing a copolymer utilizing an anthraquinone dye having a reactive double bond, and represented by the above formula 1.

In addition, the present invention relates to a copolymer for lenses containing a copolymerized component represented by the following formula 2.

(Formula 2)

wherein $R_1$ is an unsubstituted or substituted benzyl group or unsubstituted or substituted phenyl group, with the substituent(s) of the substituted benzyl group being one or more groups selected from the group consisting of >CH—CH$_2$—, a C1–C6 alkyl group, a C1–C6 alkoxy group, a hydroxyl group and a halogen atom and the substituent(s) of the substituted phenyl group being one or more groups selected from the group consisting of a C1–C6 alkyl group, a C1–C6 alkoxy group, a hydroxyl group and a halogen atom, and a lens consisting of a copolymer containing a copolymerized component represented by the formula 2 mentioned above.

Further objects, features and advantages of the present invention will become apparent from the Detailed Description of the Preferred Embodiments which follows, when considered together with the attached drawings.

DETAILED DESCRIPTION OF THE PREFERRED EMBODIMENTS

The reactive dyes represented by the above formula 1 according to the present invention are anthraquinone compounds. In the formula, $R_1$ is an unsubstituted or substituted benzyl group or unsubstituted or substituted phenyl group. The substituent(s) of the substituted benzyl group is(are) one or more groups selected from the group consisting of a vinyl group, a C1–C6 alkyl group, a C1–C6 alkoxy group, a hydroxyl group and a halogen atom. The substituent(s) of the substituted phenyl group is(are) one or more groups selected from the group consisting of a C1–C6 alkyl group, a C1–C6 alkoxy group, a hydroxyl group and a halogen atom.

As the above C1–C6 alkyl group, for example, methyl groups, ethyl groups, propyl groups, butyl groups, hexyl groups and the like can be mentioned, along with branched alkyl groups. Methyl groups and ethyl groups are particularly preferred. As the above C1–C6 alkoxy group, for example, a methoxy group (OCH$_3$) can be mentioned. As the halogen atom, for example, chlorine atom and fluorine atom can be mentioned.

The substituent(s) of the substituted benzyl group and the substituted phenyl group may be present, for example, in the 4- or 3- position, but the 4-position is preferred from the viewpoint of ease of synthesis of the dye. The substituted benzyl group and the substituted phenyl group preferably have one substituent.

When $R_1$ is a vinylbenzyl group, i.e., a benzyl group substituted with a vinyl group, the compound of the present invention is a monomer having two reactive groups. Accordingly, a copolymer formed by using such a compound has a crosslinkable structure.

Unlike the reactive dyes of EP 0396 376 A1, the reactive dye of the present invention does not have any easily hydrolyzable ester bond or amide bond between the anthraquinone structure and the reactive vinyl group. Therefore, after being incorporated into a copolymer, the reactive dye of the present invention is not hydrolyzed with water or the like. Thus, dissolution or bleeding out of the dye unit, i.e., the anthraquinone structure, is prevented. Thus, the reactive dye of the present invention can provide colored lenses extremely safe for living bodies.

Further, the reactive vinylbenzyl group shows excellent copolymerizability with other comonomers. Very little steric hindrance is observed during the polymerization because the vinyl group substitutes the para position. Furthermore, its solubility in other monomers used for optical lenses is also extremely good.

The anthraquinone compound of the formula 1 according to the present invention can be synthesized by following the synthesis schemes shown below.

Synthetic Scheme 2

AQ1

VBH

Reactive Dye (Formula 1)

Synthetic Scheme 2

Reactive Dye Precursor 2 (AQ2)

VHB

Synthetic Scheme 3

AQ2

When $R_1$ is an unsubstituted or substituted benzyl group, a reactive dye precursor 1 (AQ1) is synthesized first by reacting 1,4-diaminoanthraquinone with a halogenated benzyl derivative represented by X-$R_1$ such as benzyl chloride, vinylbenzyl chloride, hydroxybenzyl chloride or methylbenzyl chloride as shown in the synthesis scheme 1. The above 1,4-diaminoanthraquinone is commercially available and certain halogenated benzyl derivatives such as 4-vinylbenzyl chloride are also commercially available.

Then, AQ1 can be reacted with a vinylbenzyl halide (VBH) such as 4-vinylbenzyl chloride to afford a compound of the present invention (formula 1). Certain vinylbenzyl halides (VBH) such as 4-vinylbenzyl chloride are also commercially available. A bromine atom can be used instead of chlorine atom, as the halogen atom of the halogenated benzyl derivative.

When $R_1$ is an unsubstituted or substituted phenyl group, a compound of the present invention (formula 1) can be obtained by reacting the reactive dye precursor 2 (AQ2) with a vinylbenzyl halide (VBH) such as 4-vinylbenzyl chloride in accordance with the synthesis scheme 2. The reactive dye precursor 2 (AQ2) can be synthesized by reacting 1-bromo-4-aminoanthraquinone (or an anthraquinone derivative of which 4-amino group is protected) with a substituted aniline (and deprotecting the 4-amino group when an anthraquinone derivative of which 4-amino group is protected by, for example, acetylation) as shown in the scheme 3.

The reactions of the schemes 1 and 2 are preferably carried out in a solvent such as HMPA (hexamethylphosphoric acid triamide), DMSO (dimethyl sulfoxide), acetonitrile and methylene chloride. A catalyst can also be used, for example, triethylamine, tributylamine, pyridine, p-methylpyridine, 2,6-lutidine and the like can be mentioned.

For the reactions, it is desirable to use reaction vessels sufficiently preliminarily dried. Though reaction temperature may vary depending on structures of the reactants, it may suitably be about 60 to 100° C., preferably 70 to 85° C. Reaction time may also vary depending on structures of the reactants, it may suitably be 3 to 120 hours, preferably 6 to 72 hours.

After the reactions, the solvent is removed by an evaporator to isolate the product, or a solid product is precipitated by adding water and sufficiently washing with water, methanol, ethanol, hexane and the like by suction filtration under reduced pressure. The desired product can be obtained by recrystallizing the residual crystals from a proper solvent and drying them under reduced pressure. The product is preferably purified by a silica gel column, as appropriate.

In the method for producing copolymers according to the present invention, a monomer mixture containing the above reactive dye of the present invention as a monomer component is copolymerized. By this copolymerization, a colored copolymer can be obtained. Comonomers other than the reactive dye can be appropriately selected depending on the desired copolymer. Because it is a major purpose to provide copolymers for lenses in the present invention, the above monomer mixture can contain one or more kinds of monomers selected from alkyl (meth)acrylates, hydrophilic monomers, silicon-containing monomers and fluorine-containing monomers. The above monomer mixture can further contain a polymerization initiator and a crosslinking agent.

The polymerization method, conditions, kinds of polymerization initiator and crosslinking agent, the respective amounts thereof and the like can be appropriately selected depending on the desired copolymer.

The monomers used for the present invention are not particularly limited so long as they can provide transparent materials when a copolymer for lenses for eyes is intended. In particular, with respect to the production of soft contact lenses and hard contact lenses, there can be mentioned, for example, linear or branched alkyl (meth)acrylates (the expression (meth)acrylate as used herein refers to both an acrylate and a methacrylate) such as methyl methacrylate, butyl (meth)acrylate and cyclohexyl methacrylate; hydrophilic monomers such as 2-hydroxyethyl methacrylate, glycerol methacrylate, N-vinylpyrrolidone, dimethylacrylamide and methacrylic acid; silicon-containing monomers such as tris(trimethylsiloxy)silylpropyl (meth)acrylate, trimethylsiloxydimethylsilylpropyl (meth)acrylate and bis(trimethylsiloxy)methylsilylpropyl (meth)acrylate; and fluorine-containing monomers such as trifluoroethyl (meth)acrylate, hexafluoroisopropyl (meth)acrylate and perfluorooctylethyloxypropylene (meth)acrylate and the like. These monomers can be used alone or in any combination.

The crosslinking agent are for example, (meth)acrylates of polyalcohol, i.e., di- or more hydric alcohol such as ethylene glycol di(meth)acrylate, diethylene glycol di(meth) acrylate, triethylene glycol di(meth)acrylate and trimethylolpropane tri(meth)acrylate and other compounds including allyl methacrylate, triallyl isocyanurate, vinyl (meth)acrylate and the like can be used.

The copolymer of the present invention suitably contains the dye of the formula 1 of the present invention in an amount of 0.001 to 1.0 parts by weight, preferably 0.01 to 0.3 parts by weight with respect to 100 parts by weight of the comonomers.

The polymerization can be performed by a conventional method used for the production of copolymers for contact lenses. For example, radical polymerization, photopolymerization and the like can be used.

The polymerization initiator used for radical polymerization are for example, those known as common radical generators, for example, peroxides such as lauroyl peroxide, bis(4-t-butylcyclohexyl)peroxydicarbonate and 1,1-bis(t-butylperoxy) 3,3,5-trimethylcyclohexane; and azo compounds such as 2,2'-azobisisobutyronitrile, 2,2'-azobis(2,4-dimethylvaleronitrile), 2,2'-azobis(4-methoxy-2,4-dimethylvaleronitrile) and 2,2'-azobis[2-(2-imidazoline-2-yl)propane]. Bis(4-tertbutylcyclohexyl)peroxydi-carbonate is a preferred peroxide and 2,2'-azobisisobutyronitrile is a preferred azo compounds. A suitable amount of the polymerization initiator is in a range of 0.05 to 0.1 part by weight for 100 parts by weight of the monomer mixture.

The monomer mixture is fully stirred so that the components are mixed well, introduced into a mold of rod or plate shape made of metal, plastic, glass or the like, and sealed. Then, polymerization is performed by raising temperature stepwise in a temperature range of 25 to 150° C. in a temperature controlled bath. It may be preferred as the case may be that the polymerization is performed in a sealed vessel where gases such as oxygen and the like are replaced with an inert gas such as nitrogen or argon.

The thus obtained rod or plate shape material can be cut into button shape blanks and made into a lens shape by cutting and polishing. Alternatively, by pouring the above monomer mixture into a lens shape mold having a desired curvature and polymerizing it, the monomer mixture may be directly made into a lens shape.

When water-retaining soft contact lenses are desired, swelling and hydration processes are further performed. In the polymerization for all of the above cases, photopolymerization utilizing ultraviolet rays, visible rays or the like can be used.

The lenses of the present invention prepared as described above show, when they are used as lenses for eyes such as contact lenses, excellent visibility and safety in the living body. In particular, the lenses are safe for eyes because dissolution and bleed out of dye units due to hydrolysis is negligible during use.

EXAMPLES

The present invention will be further illustrated by reference to the following synthesis examples and working examples. However, the present invention is not limited only to these examples.

The measuring apparatuses which were used in the examples are as follows.

Melting point measurement:
Micromelting point apparatus (Yanagimoto Seisakusho Ltd.)

Elemental analysis:
CHN recorder MT-3 type (Yanagimoto Seisakusho Ltd.)

Proton NMR:
Proton NMR measuring apparatus R-1100 (Hitachi, Ltd.)

Light transmission factor measurement:
Automatic recording spectrophotometer U-3210 (Hitachi, Ltd.)

Synthesis Example 1 (BD-1):
Synthesis of 1,4-bis(4-vinylbenzylamino) anthraquinone Into a 50 ml eggplant type flask equipped with a cooling reflux pipe, 1,4-diaminoanthraquinone (2.0 g, 8.4 mmol), 4-vinylbenzyl chloride (3.0 g, 19.7 mmol), 2,6-lutidine (2.1 g, 19.6 mmol) and acetonitrile (30 ml) were introduced and the mixture was heated to reflux for 2 days. The reaction mixture gradually turned from purple to blue. After completion of the reaction, the reaction product was precipitated by adding 10 ml of water and blue crystals were isolated by suction filtration under reduced pressure. The crystals were sufficiently washed with water, methanol, ethanol and hexane, and dried at 80 for 48 hours under reduced pressure. The dried blue crystals were crystallized from ethanol/water. Yield: 60%

BD-1

Decomposition temperature, results of $^1$H-NMR, IR and elementary analysis of the obtained compound are shown below.

Decomposition temperature:238–240° C. $^1$H-NMR CDCl$_3$, TMS: 4.4–4.7 ppm (d, 4H), 5.1–5.4 ppm (d, 2H), 5.6–5.8 ppm (d, 2H), 6.5–6.9 ppm (m,2H), 7.0–8.5 ppm (m, 14H), 10.9 ppm (bs, 2H) Elementary analysis: Calc. for $C_{32}H_{26}N_2O_2$; C: 81.72%; H: 5.53% N: 5.95% Found C: 81.75% H: 5.48% N: 5.90%

Synthesis Examples 2 (BD-2) and 3 (BD-3):

Reaction was performed by using p-hydroxybenzyl chloride or p-methylbenzyl chloride in a molar ratio to the starting material, 1,4-diaminoanthraquinone, of 0.6, and a catalyst, 2,6- lutidine, in the same molar ratio, 0.6, to afford a reactive dye precursor in which the 1 position is substituted with p-methylbenzylamino group or p-methoxybenzylamino group. Starting from these compounds, they are reacted with 4-vinylbenzyl chloride respectively to afford reactive dyes BD-2 (Yield: 50%) and BD-3 (Yield: 45%), respectively.

BD-2

BD-3

Synthesis Example 4 (BD-4):

Reaction was performed by using the following reactants, catalyst and solvent: 1-amino-4-anilinoanthraquinone (precursor, 2.5 g, 7.96 mmol), 4-vinylbenzyl chloride (1.25 g, 8.22 mmol), 2,6-lutidine (a catalyst, 0.88 g, 8.22 mmol) and acetonitrile (solvent, 25 ml) in a reaction apparatus similar to that of Example 1. After completion of the reaction, the product was purified in the same manner as in Example 1 to afford the desired reactive dye, BD-4 (Yield: 67%).

BD-4

Example 1
Soft Contact Lens Utilizing the Dye BD-1

Figure 1:
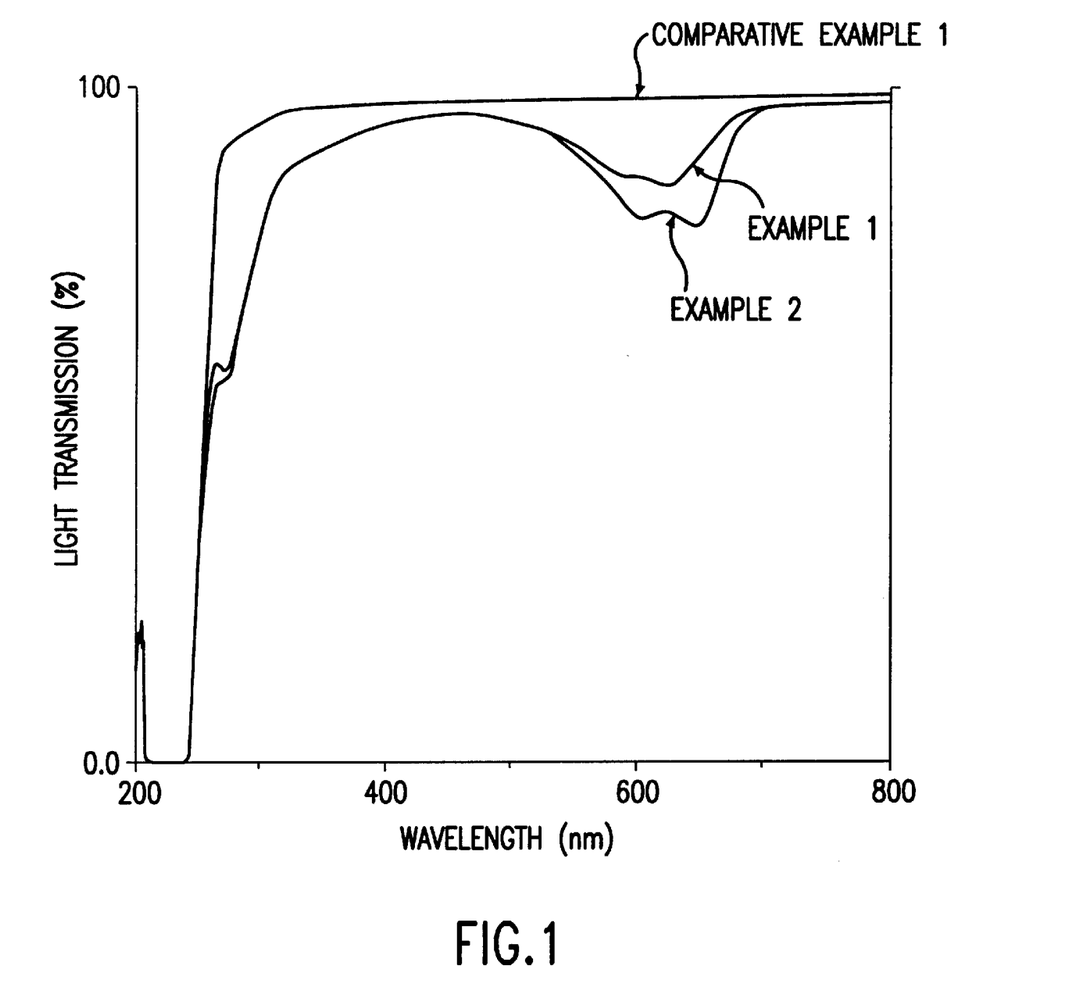
FIG. 1 shows light transmission factor (%) curves of the lenses obtained in Example 1, Example 2 and Comparative Example 1.

The dye BD-1 prepared in Synthesis Example 1 (0.003 g), HEMA (2-hydroxyethyl methacrylate, 5.85 g), methacrylic acid (0.15 g), EDMA (ethylene glycol dimethacrylate, 0.024 g) and a polymerization initiator AIBN (2,2'-azobisisobutyronitrile, 0.024 g) were introduced into a 50 ml sample pot and stirred sufficiently under nitrogen flow. Fifty microliter of this comonomer solution was introduced into a casting mold of lens shape and polymerized according to a predetermined temperature elevation schedule to afford a lens. The obtained lens was immersed in ethanol for 12 hours to remove unreacted monomers and the like. BD-1 showed good solubility in ethanol, but coloration of ethanol extract was not observed and light transmission of the lens was not changed either before or after the ethanol extraction. These results suggest that this dye shows excellent copolymerizability. Then, the lens was heat-treated at 80 for 6 hours in a borate buffer (pH 7.0) and returned to room temperature and its light transmission factor was measured. Results are shown in FIG. 1. From the results shown in FIG. 1, it is confirmed that the lens showed extremely good color and excellent visibility.

Hydrolysis Resistance Test Concerning the Dye

Then, the above lens immersed in 50 ml of the borate buffer was treated in an autoclaved sterilization device at 121° C. for 1 hour and returned to room temperature. No change of light transmission factor of the lens was observed. The lens was then immersed in 50 ml of a borate buffer of pH 9.0 and similarly treated in an autoclaved sterilization device for 1 hour and the buffer was changed to another one of pH 7.0. No change of light transmission factor of the lens was observed (See, Table 2).

The above results confirm that the dye is excellent in hydrolysis resistance.

Examples 2 to 5

Figure 2:
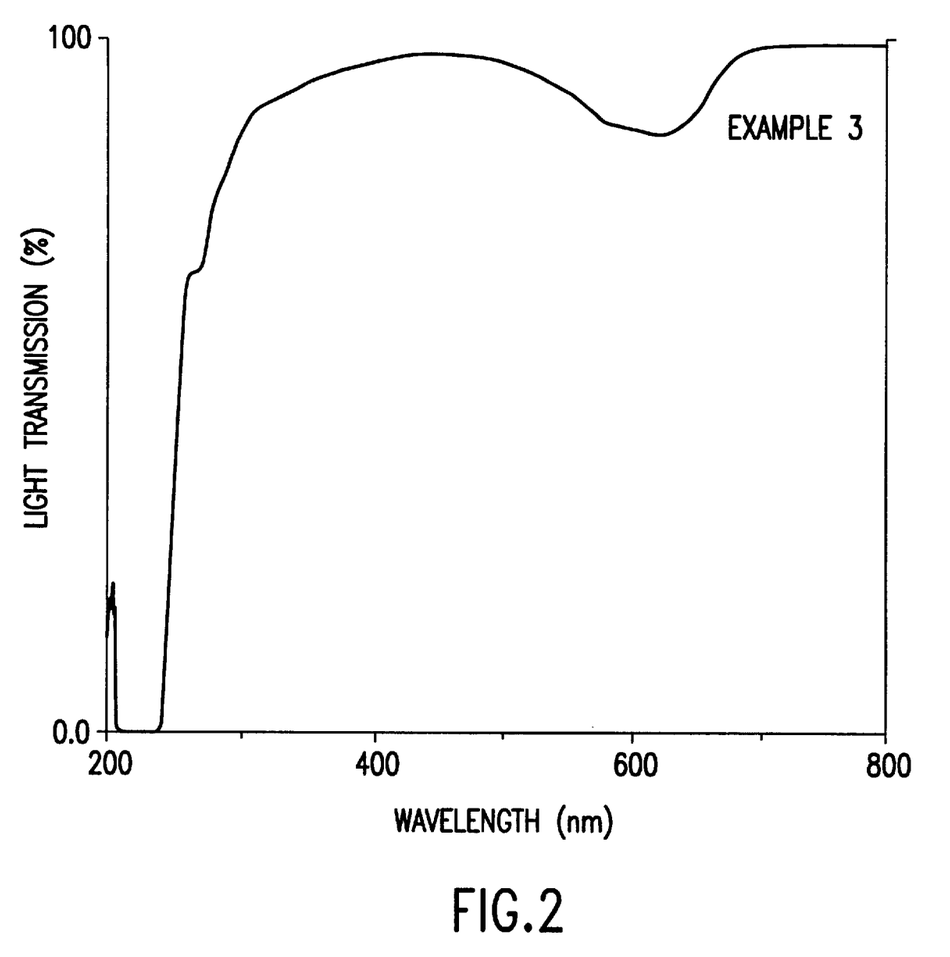
FIG. 2 shows a light transmission factor (%) curve of the lens obtained in Example 3.

Lenses were prepared in a manner similar to that of Example 1 except that the compositions shown in Table 1 were used. The result of light transmission factor measurements of the lens of Example 2 is shown in FIG. 1. Result of light transmission factor measurement of the lens of Example 3 is shown in FIG. 2. From the results of FIGS. 1 and 2, it can be seen that these lenses showed extremely good color and excellent visibility.

The results of a hydrolysis resistance test for these lenses are shown in Table 2. No dissolution of unreacted dye into ethanol and no change of light transmission factor were observed in Examples 2 to 5, and it was determined that the dyes were excellent in copolymerizability. Furthermore, the lenses showed no change of light transmission factor after the autoclaved sterilization treatment and the heat treatment in borate buffer of pH 9.0.

Like in Example 1, it was determined that these dyes are excellent in copolymerizability and hydrolysis resistance.

Comparative Example 1

A lens was prepared in a manner similar to that of Example 1 except that the composition shown in Table 1 (not containing a dye) was used. The obtained lens was immersed in ethanol for 12 hours and heat-treated in a borate buffer of pH 7.0 at 80 for 6 hours. Then, light transmission factor of the lens was measured at room temperature. The result is shown in FIG. 1.

Comparative Example 2

A lens was prepared in a manner similar to that of Example 1 except that the composition shown in Table 1 was used (BD-5 disclosed in EP 0 396 376 A1 was used as a dye).

Figure 3:
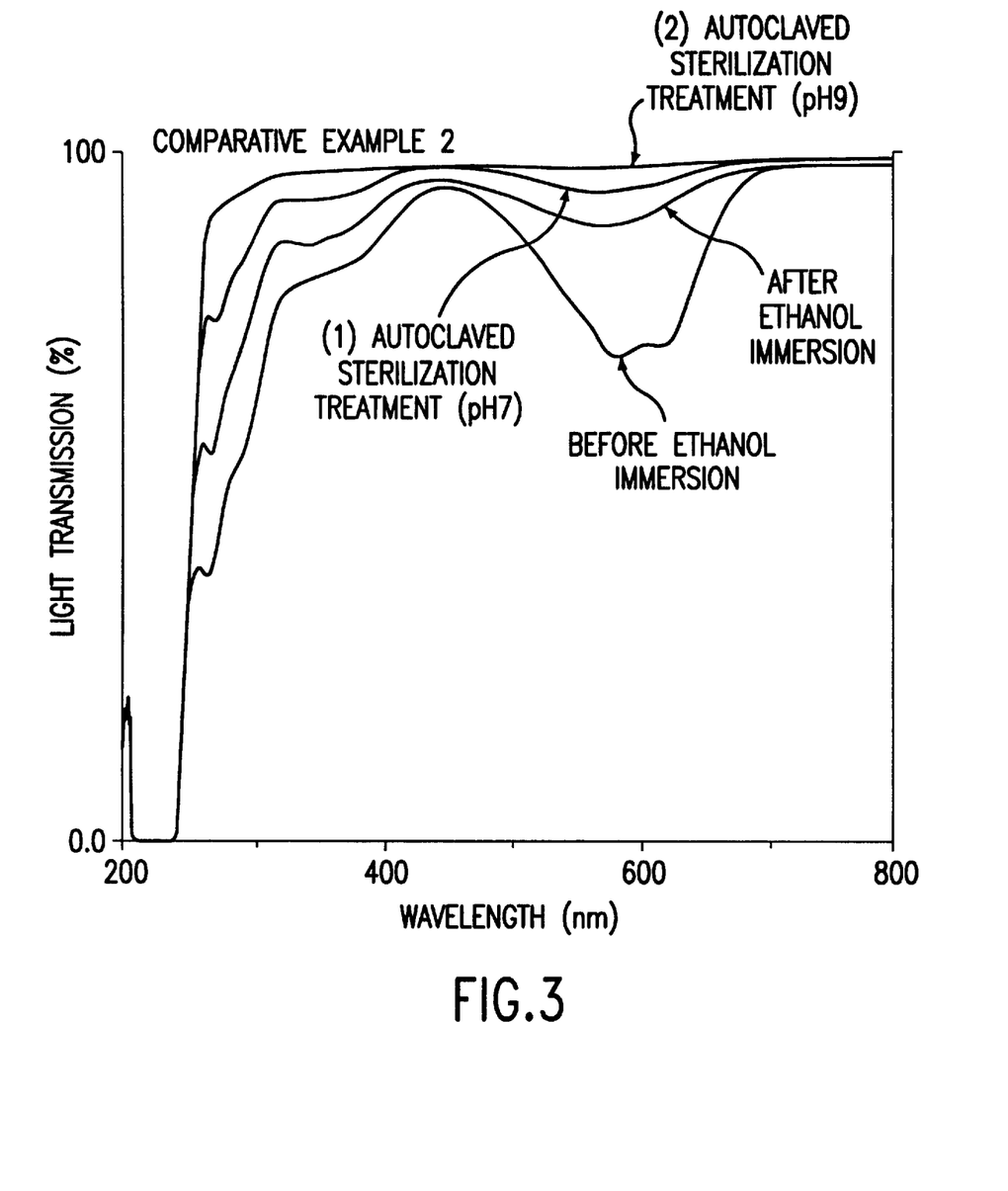
FIG. 3 shows light transmission factor (%) curves of the lens obtained in Comparative Example 2.

When the lens obtained was immersed in ethanol for 12 hours to remove unreacted dye, unlike the Examples of the present invention, dye was dissolved into the ethanol. A 19% increase of light transmission factor (at 600 nm) of the lens was observed as shown in FIG. 3. This suggests that copolymerizability of the dye monomer is extremely bad. Further, marked increase of light transmission factor was also observed in the hydrolysis resistance test as shown in FIG. 3 and Table 2.

Comparative Example 3

A transparent blue lens was prepared in a manner similar to that of Example 1 except that the composition shown in Table 1 was used (BD-5 was used as a dye). Like Comparative Example 2, the extract was colored blue during the extraction for removing unreacted dye. In fact, 8% increase of light transmission factor (at 600 nm) of the lens was observed in the measurement of light transmission factor of the lens. This suggests that copolymerizability of the dye monomer is extremely bad. Furthermore, a marked increase of the light transmission factor was also observed in the hydrolysis resistance test as shown in Table 2.

Comparing the above results of Comparative Examples 2 and 3 with the results of Examples 1 to 5, it was confirmed that the lenses of the present invention utilizing the reactive dyes of the present invention are superior in copolymerizability and hydrolysis resistance compared with the lens of Comparative Example 2 utilizing BD-5.

BD-5

TABLE 1

Examples and Comparative Examples (Polymerization Composition)

| | Example 1 | Example 2 | Example 3 | Example 4 | Example 5 | Comparative Example 1 | Comparative Example 2 | Comparative Example 3 |
|---|---|---|---|---|---|---|---|---|
| Monomer Composition | | | | | | | | |
| HEMA | 97.1 | 20 | 100 | 10 | 20 | 97.1 | 97.1 | 100 |
| MAA | 2.5 | | | | | 2.5 | 2.5 | |
| MMA | | 31 | | 27 | 31 | | | |
| NVP | | 35 | | 52 | 35 | | | |
| DMAA | | 13 | | 10 | 13 | | | |
| EDMA | 0.4 | 1.0 | | 1.0 | 1.0 | 0.4 | 0.4 | |
| Dye | | | | | | | | |
| BD-1 | 0.05 | 0.01 | | | | | | |
| BD-2 | | | 0.1 | | | | | |
| BD-3 | | | | 0.05 | | | | |
| BD-4 | | | | | 0.01 | | | |
| BD-5 | | | | | | | 0.1 | 0.05 |
| Polymerization initiator | | | | | | | | |
| AIBN | 0.4 | 0.4 | 0.4 | | 0.4 | 0.4 | 0.4 | 0.4 |
| V-65 | | | | 0.3 | | | | |

TABLE 2

Evaluation of Copolymerizability and Hydrolysis Resistance

| | Example 1 | Example 2 | Example 3 | Example 4 | Example 5 | Comparative Example 1 | Comparative Example 2 | Comparative Example 3 |
|---|---|---|---|---|---|---|---|---|
| 1. Copolymerizability | | | | | | | | |
| Change of light transmission factor between before and after ethanol treatment | No change | No change | No change | No change | No change | — | 19% increase (at 600 nm) | 8% increase (at 600 nm) |
| 2. Hydrolysis Resistance | | | | | | | | |
| (1) Autoclaved sterilization 121, 1 hour | No change | No change | No change | No change | No change | — | 4.3% increase (at 600 nm) | 3% increase (at 600 nm) |
| (2) Autoclaved sterilization 121, 1 hour in pH 9.0 buffer | No change | No change | No change | No change | No change | — | 7.3% increase (at 600 nm) | 5% increase (at 600 nm) |

Note:)
Light transmission factor after the ethanol treatment was taken as standard.

All of the numerical values in the Tables indicate "parts by weight" and the meanings of the abbreviations in Tables are as follows.

HEMA: 2-hydroxyethyl methacrylate
MMA: Methyl methacrylate
NVP: N-vinylpyrrolidone
DMAA: Dimethyl acrylamide
EDMA: Ethylene glycol dimethacrylate
AIBN: 2,2'-azobisisobutyronitrile
V-65: 2,2'-azobis(2,4-dimethylvaleronitrile)

According to the present invention, there are provided novel reactive dyes showing excellent hydrolysis resistance, good copolymerizability with other comonomers, excellent dyeing properties and appropriate solubility in comonomers.

According to the present invention, there are further provided copolymers for colored lenses and lenses such as contact lenses, which exhibit extremely low risk of dissolution and bleeding out of dye, high safety and excellent visibility through them.

While the present invention has been illustrated by means of several preferred embodiments, one of ordinary skill in the art will understand that modifications, substitutions and improvements can be made while remaining within the spirit and scope of the present invention. The scope of the invention is determined solely by the appended claims.

What is claimed is:

1. A soft contact lens comprising a copolymer produced by copolymerizing a monomer mixture comprising a compound of formula 1:

(Formula 1)

wherein $R_1$ is an unsubstituted or substituted benzyl group or unsubstituted or substituted phenyl group; wherein the substituent(s) of the substituted benzyl group are one or more groups selected from the group consisting of a vinyl group, a C1–C6 alkyl group, a C1–C6 alkoxy group, hydroxyl group and a halogen atom; and wherein the substituent(s) of the substituted phenyl group are on or more groups selected from the group consisting of a C1–C6 alkyl group, an C1–C6 alkoxy group, a hydroxyl group and a halogen atom.

2. A lens according to claim 1, wherein the monomer mixture further comprises one or more monomers selected from the group consisting of alkyl (meth)acrylates, hydrophilic monomers, silicon-containing monomers and fluorine-containing monomers.

3. A lens comprising a copolymer produced by copolymerizing a monomer mixture comprising (a) a compound of formula 1:

(Formula 1)

wherein $R_1$ is a 4-monosubstituted benzyl group or 4-monosubstituted phenyl group; wherein the substituent(s) of the substituted benzyl group are one or more groups selected from the group consisting of a vinyl group, a C1–C6 alkyl group, a C1–C6 alkoxy group, hydroxyl group and a halogen atom; and wherein the substituent(s) of the substituted phenyl group are on or more groups selected from the group consisting of a C1–C6 alkyl group, an C1–C6 alkoxy group, a hydroxyl group and a halogen atom; and (b) one or more monomers selected from the group consisting of alkyl (meth)acrylates, hydrophilic monomers, silicon-containing monomers and fluorine-containing monomers.

4. A lens according to claim 3 wherein $R_1$ is a 4-monosubstituted benzyl group.

5. A lens according claim 3 wherein $R_1$ is a 4-monosubstituted phenyl group.

6. A lens according to claim 3, wherein $R_1$ is paravinyl benzyl.

7. A lens according to claim 3, wherein $R_1$ is parahydroxy benzyl.

8. A lens according to claim 3, wherein $R_1$ is paramethyl benzyl.

* * * * *